July 1, 1947.    J. H. MOORE    2,423,201
WORK SUPPORT
Filed April 1, 1944
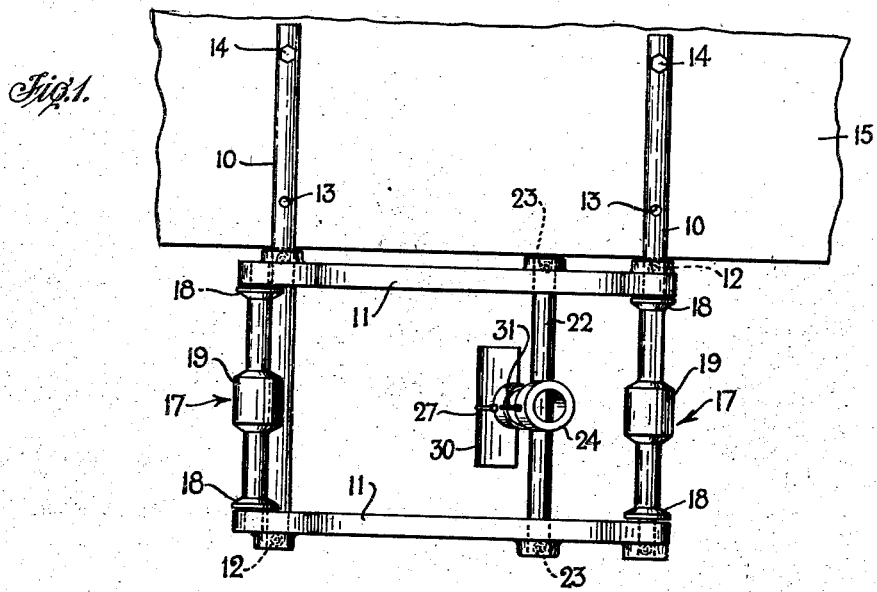
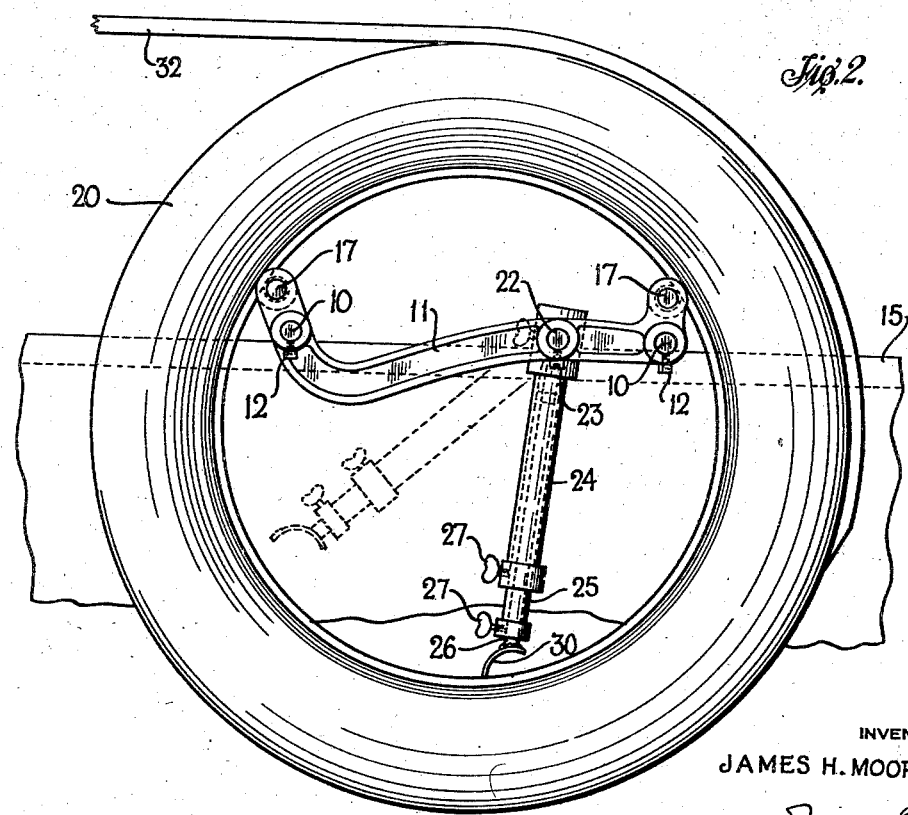
INVENTOR
JAMES H. MOORE
BY
ATTORNEYS Patented July 1, 1947

2,423,201

UNITED STATES PATENT OFFICE 2,423,201

WORK SUPPORT

James H. Moore, Akron, Ohio

Application April 1, 1944, Serial No. 529,212

1 Claim. (Cl. 154—9)

This invention relates to work supports upon which an annular article, such as a vehicle tire, may be mounted for rotary movement about its own axis, and more especially it relates to work supports of the character mentioned that enable rotation of the work solely in one direction.

The device is of especial utility in tire repair shops where repairs, such as re-capping or re-treading, are made.

The chief objects of the invention are to provide an improved centerless work support for annular articles; to provide a support of the character mentioned enabling quick and easy mounting and dismounting of the work; to provide a work support of the character mentioned that will not deform the article; to provide a support that will operatively accommodate articles of a wide range of sizes; to provide a support that readily may be altered to suit the convenience of left-handed workmen; and to provide a work support that enables the work to rotate in either direction yet readily is altered so as to limit rotation of the work to one direction. A more specific object is to provide an improved braking means for centerless work supports for annular articles. Other objects will be manifest as the description proceeds.

Of the accompanying drawing:

Fig. 1 is a plan view of a work support embodying the invention; and

Fig. 2 is a side elevation thereof, and a pneumatic tire casing supported thereon and operatively engaged thereby.

Referring to the drawing, the invention is shown as comprising a pair of parallel supporting rods or arms 10, 10 that together carry a pair of substantially identical side-frame members 11, 11, one of which is located at the ends of the rods 10 and the other substantially medially of the ends of the rods. The members 11 are removably secured to the rods 10 by set screws 12. The rods 10 project laterally from one of the frame members 11, their projecting portions being formed with bolt-holes 13 to receive respective bolts 14 by means of which the device is secured to a suitable support, such as the work bench 15.

Opposite end portions of the frame members 11 are formed with suitable bearings that are located above the rods 10, and journaled in said bearings are a pair of parallel work-supporting rollers 17, 17, said rollers disposed in the same horizontal plane. Each roller 17 is of reduced diameter in local regions on opposite sides of the middle thereof, whereby the roller is provided with end flanges 18, 18, and a relatively wide medial flange 19. When a tire casing, such as the casing shown at 20, Fig. 2, is mounted upon the device, the bead portions of the tire are received upon the rollers 17 in the regions thereof of reduced diameter, the flanges 19 extending between the tire beads and limiting their approach toward each other, the flanges 18 preventing the tire beads from coming into contact with the frame members 11. The reduced portions of the rollers 17 between the flanges 18, 19 are of adequate axial extent to accommodate the bead portions of tires of a large range of sizes. It will be obvious that a tire casing supported in the manner described may be manually impelled to rotate freely in either direction.

The side frame members 11 also support a horizontal rod 22 by engagement with opposite ends thereof, said rod being secured against rotation by set screws 23. The rod 22 is disposed parallel to the rods 10 and rollers 17, but is substantially nearer to one of said rods and rollers than to the others. Swivelled at its upper end upon the rod 22, at the middle thereof, is an extensible, depending arm 24, said arm being tubular, and being extensible by reason of a smaller tube 25 telescopically mounted therein and a rod 26 telescopically mounted in the latter, said tube and rod extending from the lower or free end of the arm. Thumb screws 27, 27 are provided for securing the tube 25 and rod 26 in the desired relation to the arm 24 whereby the effective length of the latter is adjustably controlled. Said thumb screws 27 also prevent the tube 25 and rod 26 from turning on their own longitudinal axis.

Secured to the lower or outer end of the rod 26 is a metal plate 30, herein shown as arcuate although it is not necessarily of such shape, it being essential only that one margin of the plate be downwardly presented. The plate 30 constitutes a pawl that is adapted to engage the inner circumference or bead portions of the tire 20 and act as a brake to prevent rotation thereof in one direction, that is, counterclockwise as viewed in Fig. 2. The arm 24 is provided with a thumb screw 31 at the pivoted end thereof, which thumb screw may be tightened to engage the rod 22 and thereby to hold the arm 24 fixedly in determinate position. Thus the arm 24 may be fixed in the position shown in broken lines in Fig. 2 when it is desired to rotate the tire 20 in both directions, the plate 30 thereby being held out of engagement with the tire.

Normally the arm 24 swings freely upon its pivotal support 22. Its length is adjusted so that when a tire 20 is mounted upon the rollers 17 of the device as shown, the plate 30 will rest upon the inner circumferential surface of the tire, and be held thereby at a slight angle from true vertical position. Then if the tire is rotated in the direction that urges the arm 24 to a greater angle from true vertical, the surface of the tire will move freely under the plate 30. However, if attempt is made to rotate the tire in the opposite direction, counterclockwise as viewed in Fig. 2, the arm 24 is urged toward vertical position, and is axially cramped between the inner circumference of the tire and its pivot rod 22. This prevents rotation of the tire in counterclockwise direction.

The improved work support is extremely simple in its construction and its operation. Tires are mounted and dismounted simply by lifting them onto and off of the rollers 17 of the device. The device will support tires of a large range of sizes, and the extensible feature of the arm 24 makes it possible for the pawl-plate 30 properly to engage the inner circumference of all tires that the rollers 17 can support. The device is extremely rugged and durable. The only element of the device that is subject to strain during use is the arm 24, and since operational strains are directed longitudinally of the arm, no damage thereto is likely to result.

The invention is adaptable for use in many different tire-repair operations, as will be apparent to those skilled in that art. In Fig. 2 the tire 20 is shown as a tread-slab 32 is applied thereto during a re-capping operation, the operator (not shown) standing at the left of the tire and manually rotating the tire in clockwise direction. Intermittently the operator applies tension to the tread-slab to stretch the same and to assure that it will fit snugly against the periphery of the tire carcass, the pawl-plate 30 preventing counterclockwise turning of the tire during such periods that the tread-slab is tensioned. Tensioning of the tread-slab results in economy of tread stock.

When the work support is arranged as shown in the drawing, the work bench 15 is at the left of the operator. However, some operators find it difficult to work in this position and prefer that the work bench, whereon they place their tools, be at their right. When such condition obtains it is a simple matter to remove the supporting rods 10 from the side frame members 11 and reinsert them therein from the opposite side thereof. Then when the device again is mounted on the work bench the position of the pawl-arm 24 will be reversed and the operator may work from the right side of the device, with the work bench at his right.

The improved work support is readily portable and quickly may be set up for use in any convenient place. Furthermore, its use will not deform a tire, as do expansible chucks sometimes used for the same purpose, with the result that superior and uniform tire repairs are effected.

Modification may be resorted to without departing from the spirit of the invention or the scope thereof as defined by the appended claim.

What is claimed is:

In a work support of the character described, a frame, roller means carried thereby adapted rotatably to support an annular article in a vertical plane, and pawl-like brake means carried by the frame and adapted to engage the article to prevent rotation thereof in one direction, said frame comprising a pair of rods that project laterally therefrom and are attachable to a work bench, whereby the work support is in overhanging relation to the latter, said rods being removably mounted in the frame, whereby they may be reversed so as to project from the opposite side thereof, the arrangement being such that the work bench on which the device is mounted will be at the opposite hand of a workman operating the same.

JAMES H. MOORE.

REFERENCES CITED

The following references are of record in the file of this patent:

UNITED STATES PATENTS

| Number | Name | Date |
|---|---|---|
| 1,194,565 | Stevens | Aug. 15, 1916 |
| 2,189,203 | Glynn | Feb. 6, 1940 |
| 2,085,650 | Godfrey, Jr. | June 29, 1937 |
| 349,362 | Roots | Sept. 21, 1886 |
| 575,249 | Koven | Jan. 12, 1897 |

FOREIGN PATENTS

| Number | Country | Date |
|---|---|---|
| 373,629 | Italy | Aug. 1, 1939 |
| 5,474 | Norway | 1897 |